US011006632B2

(12) United States Patent
Śmiglak et al.

(10) Patent No.: US 11,006,632 B2
(45) Date of Patent: May 18, 2021

(54) APPLICATION OF 7-CARBOXYBENZO[1,2,3]THIADIAZOLE AMIDES AS PLANT STIMULANTS

(71) Applicant: ADAM MICKIEWICZ UNIVERSITY FOUNDATION, Poznań (PL)

(72) Inventors: Marcin Śmiglak, Poznań (PL); Henryk Pospieszny, Poznań (PL); Rafal Kukawka, Poznań (PL); Piotr Lewandowski, Koszalin (PL); Olga Stolarska, Poznań (PL); Hieronim Maciejewski, Poznań (PL)

(73) Assignee: Adam Mickiewicz University Foundation, Poznan (PL)

( * ) Notice: Subject to any disclaimer, the term of this patent is extended or adjusted under 35 U.S.C. 154(b) by 0 days.

(21) Appl. No.: 15/747,622

(22) PCT Filed: Jul. 27, 2016

(86) PCT No.: PCT/IB2016/054491
§ 371 (c)(1),
(2) Date: Jan. 25, 2018

(87) PCT Pub. No.: WO2017/017626
PCT Pub. Date: Feb. 2, 2017

(65) Prior Publication Data
US 2018/0213783 A1    Aug. 2, 2018

(30) Foreign Application Priority Data
Jul. 28, 2015 (PL) .......................................... 413298

(51) Int. Cl.
*A01N 43/82* (2006.01)
*A01N 43/653* (2006.01)

(52) U.S. Cl.
CPC .................................. *A01N 43/82* (2013.01)

(58) Field of Classification Search
CPC combination set(s) only.
See application file for complete search history.

(56) References Cited

U.S. PATENT DOCUMENTS

| | | | |
|---|---|---|---|
| 4,931,581 A | 6/1990 | Schurter et al. | |
| 5,066,661 A | 11/1991 | Kunz et al. | |
| 5,190,928 A | 3/1993 | Schurter et al. | |
| 5,523,311 A | 6/1996 | Schurter et al. | |
| 2003/0109705 A1 | 6/2003 | Grina | |
| 2005/0171358 A1* | 8/2005 | Shimozono et al. | A01N 43/80 548/247 |
| 2011/0218103 A1 | 9/2011 | Frackenpohl et al. | |

FOREIGN PATENT DOCUMENTS

| | | |
|---|---|---|
| CN | 1680342 | 1/2009 |
| CN | 102731434 A | 10/2012 |
| CN | 104530037 | 4/2015 |
| DE | 102008006622 A1 | 7/2009 |
| EP | 2392210 | 12/2011 |
| JP | H02-009377 A | 1/1997 |
| PL | 405491 | 4/2015 |
| PL | 405507 | 4/2015 |
| PL | 230659 | 11/2018 |
| PL | 231217 | 2/2019 |
| WO | 2009/095098 A2 | 8/2009 |

OTHER PUBLICATIONS

Tebuconazole 250EW label, Villa Crop Protection (Aug. 2012).*
McMullen, M.P. et al., "Seed treatment for disease control," North Dakota State University pp. 447, Fargo, ND, pp. 1-8, Mar. 2000, retrieved from the Internet on Dec. 16, 2019:<https://library.ndsu.edu/ir/bitstrearn/handle/10365/9120/PP447_2000.pdf?sequence=1&isAllowed=y >.*
International Search Report and Written Opinion dated Sep. 27, 2016, from International Application No. PCT/IB2016/054491, 17 pages.
Lewandowski, P. et al. "Bifunctional quaternary ammonium salts based on benzo[1,2,3]thiadiazole-7-carboxylate as plant systemic acquired resistance inducers", New J. Chem., 2014, 38, 1372-1375.
Śmiglak, M. et al. "Cationic derivatives of the plant resistance inducer benzo[1,2,3]thiadiazole-7-carbothioic acid S-methyl ester (BTH) as bifunctional ionic liquids", Tetrahedron Letters 55 (2014) pp. 3565-3568.
Thakur, M. et al. "Role of Elicitors in Inducing Resistance in Plants against Pathogen Infection: A Review", ISRN Biochemistry, vol. 2013, 10 pages.
Communication pursuant to Article 94(3) EPC dated Feb. 1, 2019, issued in related EP Application No. 16750266.5, 13 pages.
Kunz, W. et al. "The Chemistry of Benzothiadiazole Plant Activators," Pesticide Sciences, 1997, 50, pp. 275-282.
Communication pursuant to Article 94(3) EPC dated Aug. 29, 2019, issued in related EP Application No. 16750266.5, 11 pages.
Rivas-San Vicente, M. et al: "Salicyclic acid beyond defence: its role in plant growth and development", Journal of Experimental Botany, vol. 62, No. 10, Feb. 28, 2011.
Notifications of Defects and English Translation dated Nov. 11, 2019, in related IL Application No. 257168.
Notification of Deficiencies and English Translation dated Mar. 18, 2020, in related IL Application No. 257188.

(Continued)

*Primary Examiner* — John Pak
(74) *Attorney, Agent, or Firm* — Meunier Carlin & Curfman LLC

(57) ABSTRACT

Disclosed herein are amide 7-carboxybenzo[1,2,3]thiadiazoles and derivatives thereof having a general Formula I, as described herein. Combinations and compositions of these compounds are also disclosed. The compounds and compositions can be used as a plant stimulant. For example, the compounds compositions can be used to regulate the plant's growth, regulate the plant's metabolic processes, regulate the plant's physiological processes, prevent against effects of biotic stress in the plant, or prevent against effects of abiotic stress in the plant. In some embodiments, the composition can provide multiple disease resistance to plants infected with a fungus, virus, or bacteria.

20 Claims, 1 Drawing Sheet

(56) References Cited

OTHER PUBLICATIONS

Communication pursuant to Article 94(3) EPC dated Mar. 19, 2020, issued in related Application No. 16750266.5, 10 pages.
Al, et al. "N-(1-Cyano-1-methylbutyl)-1,2,3-benzothia-diazole-7-carboxamide", Acta Crystallographica, Section E: Structure Reports Online, 2005, 61(11),o3891-o3892.
Office Action dated Jun. 9, 2020, from related application No. JP 2018-524569, 9 pages.
Notification of Deficiencies dated Jul. 22, 2020, in related IL Application No. 257168, 7 pages.
Office Action dated Sep. 23, 2020, from related AU application No. 2016300210, 5 pages.
Office Action dated Sep. 10, 2020, from related EP application No. 16750266.5, 12 pages.
Office Action dated Dec. 15, 2020, from related AU application No. 2016300210, 7 pages.

* cited by examiner

APPLICATION OF 7-CARBOXYBENZO[1,2,3]THIADIAZOLE AMIDES AS PLANT STIMULANTS

FIELD

This disclosure relates generally to the use of 7-carboxybenzo[1,2,3]thiadiazole amides, and in particular, to their use as a plant stimulant.

BACKGROUND

Plants resistance to environmental factors, that is, their defense mechanisms enabling the plants to survive under stress conditions, can be either constitutive or inducible. In the first case, the defense mechanisms are enabled for the whole life of the plant. Induced resistance arises from the action of stress factors, that is, stressors. Environmental stress factors include biotic and abiotic stressors. The abiotic stressors include temperature (high, cold, and frost), light radiation (high and low), drought, lack of oxygen, mechanical factors (wind, snow cover, and ice cover), and chemical compounds (salinity, toxins, and mineral deficiency). The biotic stressors include microorganisms (fungi and bacteria), viruses, plants (allelopathy, parasitism, and competition), and animals (bite, parasitism, and trampling). There is a constant search for methods/solutions to ensure the best conditions for plant growth and development, for example by protecting plants against the occurrence of various biotic and abiotic stressors and thus leading to increasing crop yields. By providing the plants optimum growing conditions by all known agro-technical methods (such as tillage, crop rotation, fertilization, irrigation, and protection against diseases, pests, and weeds), farmers strive to achieve even higher yields and better quality.

Plants stimulants have been used in the cultivation of plants in order to improve the growth and development processes. The impact of stimulants on plants is believed to be due to its effect on metabolism rather that the direct participation in the regulation of life processes. Plant stimulants can stimulate the synthesis of natural hormones, and sometimes increase their activity, can improve intake of minerals from the soil, and regulate the growth of roots. In addition, they can cause the increase of the resistance to adverse conditions including biotic and abiotic stresses. The use of stimulants in the cultivation of plants can increase their yields, often while increasing their quality at the same time. Stimulants can also enhance life processes occurring in plants without changing the plant's natural behavior.

Some compounds are known to act as inducers of plant natural defenses, for example, salicylic acid, isonicotinic acid, chitosans, and non-proteic β-aminobutyric aminoacid (BABA). However, the effectiveness of these compounds varies among plant species and among monocotyledon and dicotyledon species. For example, the ability of BABA to induce resistance depends on abscisic acid (ABA)-mediated signaling pathway and chalose accumulation. Early studies on the application of benzo[1,2,3]thiadiazole derivatives on plants have been discussed in U.S. Pat. Nos. 5,190,928 and 5,523,311. These studies illustrate the synthesis of benzo[1,2,3]thiadiazole derivatives but only their application in the protection (immunization process) of plants against attack by phytopathogenic microorganisms or viruses. However, the use of these compounds as plant stimulants, such as a plant growth regulator, is not known.

There is a need for compounds that can stimulate plants against various stress conditions. The compositions and methods described herein address these and other needs.

SUMMARY

In accordance with the purposes of the disclosed methods and systems, as embodied and broadly described herein, the disclosed subject matter relates to compositions and methods of making and using such compositions. In more specific aspects, disclosed herein are amide 7-carboxybenzo[1,2,3]thiadiazoles or a derivatives thereof having a general Formula I,

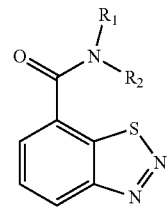

Formula I wherein $R_1$ and $R_2$ are independently selected from hydrogen, a $C_1$-$C_{20}$ linear alkyl group, a $C_1$-$C_{20}$ linear alkoxy group, a $C_1$-$C_{20}$ branched alkyl group, a $C_1$-$C_{20}$ branched alkoxy group, a $C_1$-$C_{20}$ cyclic alkyl group, and a $C_1$-$C_{20}$ cyclic alkoxy group, wherein each of $R_1$ and $R_2$ optionally comprises one or more heteroatoms, an unsaturated bond, or an aryl group. In some embodiments, $R_1$ and $R_2$ are independently selected from hydrogen, a $C_1$-$C_6$ linear alkyl group, and a $C_1$-$C_6$ linear alkoxy group. In further aspects, compositions comprising amide 7-carboxybenzo[1,2,3]thiadiazoles or a derivatives there are disclosed herein. In some aspects, the compositions can comprise N-methyl, N-methoxy-7-carboxybenzo[1,2,3]thiadiazole. The compositions can include the compound of Formula I in a concentration of from 0.001 to 900 mg/L, such as from 0.01 to 100 mg/L.

The compositions described herein can be in any suitable form for application to a plant. In some aspects, the compositions can be in the form of an aqueous solution, an organic solvent solution, a mixture comprising inorganic and organic solvents such as a mixture of water and an alcohol, or an emulsion. When the compositions comprise a mixture of inorganic and organic solvents, the solvents can be in a ratio of from 1:1000 to 1000:1.

The compositions described herein may further comprise an adjuvant. The adjuvant can be in an amount of 10% by volume or less, based on the volume of the composition. In some aspects, the compositions can include a fungicidal agent, an antiviral agent, or an antibacterial agent.

The compositions described herein can be used as a plant stimulant. For example, the compositions can be used to regulate the plant's growth, regulate the plant's metabolic processes, regulate the plant's physiological processes, prevent against effects of biotic stress in the plant, or prevent against effects of abiotic stress in the plant. In some embodiments, the compositions can provide multiple disease resistance to plants. In some embodiments, compositions can be used as a stimulant in a plant that has a disease caused by a pathogenic agent. The pathogenic agent can be a virus, viroid, or a microorganism such as fungi, bacteria, mycoplasm, or spiroplams. For example, the pathogenic agent can be Pseudomonas syringae py. tomato, tobacco mosaic virus, powdery mildew, Brome mosaic virus, Nicotiniana Tabacum var. Xanthi, or combinations thereof.

Methods of using the compositions are also disclosed herein. The method can include contacting the root or leaves of the plant with the disclosed compounds or compositions. In some aspects, the compositions can be administered to the roots by spraying the soil, mechanical incorporation, mixing with a fertilizer, soil improvement, or such the like. The compositions can be administered intermittently. In some aspects, the compositions can be administered about 1 to about 5 times on the plant. In some aspects, the compositions can be administered once per week.

Additional advantages will be set forth in part in the description that follows or may be learned by practice of the aspects described below. The advantages described below will be realized and attained by elements and combinations particularly pointed out in the appended claims. It is to be understood that both the foregoing general description and the following detailed description are exemplary and explanatory only and are not restrictive.

BRIEF DESCRIPTION OF THE FIGURES

The accompanying figures, which are incorporated in and constitute a part of this specification, illustrate several aspects described below.

DETAILED DESCRIPTION

Figure 1:
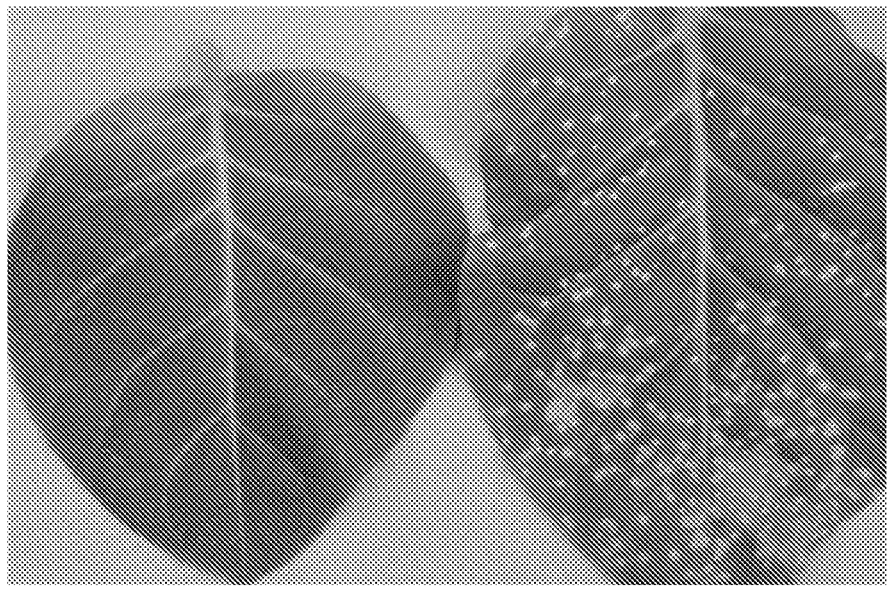
FIG. 1 is an image showing a tobacco leaf after 5 days post infection with Tobacco Mosaic Virus (the leaf was previously treated with BTHWA and infected with the virus at 7 days post treatment) (left), and the untreated tobacco leaf after 5 days post infection with the Tobacco Mosaic Virus (control; right).

Provided herein are amide 7-carboxybenzo[1,2,3]thiadiazoles, derivatives thereof, compositions thereof, and methods of using such compounds and compositions. The compounds and compositions can be used as a plant stimulant. Methods of making and using the compounds and compositions are also described.

The compounds, compositions, and methods described herein can be understood more readily by reference to the following detailed description of specific aspects of the disclosed subject matter and the Examples included therein. However, before the present compositions and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

General Definitions

In this specification and in the claims that follow, reference will be made to a number of terms, which shall be defined to have the following meanings:

Throughout this specification the word "comprise" and other forms of the word, such as "comprising" and "comprises," means including but not limited to, and is not intended to exclude, for example, other additives, components, integers, or steps.

The singular forms "a," "an," and "the" include plural referents unless the context clearly dictates otherwise. Thus, for example, reference to "a derivative" includes mixtures of two or more such derivatives; reference to "an amide derivative" includes two or more such derivatives; reference to "the compound" includes mixtures of two or more such compounds, and the like.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that when a value is disclosed, then "less than or equal to" the value, "greater than or equal to the value," and possible ranges between values are also disclosed, as appropriately understood by the skilled artisan. For example, if the value "10" is disclosed, then "less than or equal to 10" as well as "greater than or equal to 10" is also disclosed. It is also understood that throughout the application data are provided in a number of different formats and that this data represent endpoints and starting points and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

By "contacting" is meant an instance of close physical contact of at least one substance to another substance.

Chemical Definitions

Terms used herein will have their customary meaning in the art unless specified otherwise. The organic moieties mentioned when defining variable positions within the general formulae described herein (e.g., the term "halogen") are collective terms for the individual substituents encompassed by the organic moiety. The prefix $C_n$-$C_m$ indicates in each case the possible number of carbon atoms in the group.

References in the specification and concluding claims to the molar ratio of a particular element or component in a composition denotes the molar relationship between the element or component and any other elements or components in the composition or article for which a part by weight is expressed. Thus, in a compound containing 2 moles of X and 5 moles of Y, X and Y are present at a molar ratio of 2:5, and are present in such ratio regardless of whether additional components are contained in the compound.

A weight percent (wt %) of a component, unless specifically stated to the contrary, is based on the total weight of the formulation or composition in which the component is included.

The term "aliphatic" as used herein refers to a non-aromatic hydrocarbon group and includes branched and unbranched (linear), alkyl, alkenyl, or alkynyl groups.

The term "alkyl," as used herein, refers to saturated straight, branched, primary, secondary or tertiary hydrocarbons, including those having 1 to 20 atoms. In some examples, alkyl groups will include $C_1$-$C_{12}$, $C_1$-$C_{10}$, $C_1$-$C_8$, $C_1$-$C_6$, $C_1$-$C_5$, $C_1$-$C_4$, $C_1$-$C_3$, or $C_1$-$C_2$ alkyl groups. Examples of $C_1$-$C_{10}$ alkyl groups include, but are not limited to, methyl, ethyl, propyl, 1-methylethyl, butyl, 1-methylpropyl, 2-methylpropyl, 1,1-dimethylethyl, pentyl, 1-methylbutyl, 2-methylbutyl, 3-methylbutyl, 2,2-dimethylpropyl, 1-ethylpropyl, hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, heptyl, octyl, 2-ethylhexyl, nonyl and decyl groups, as well as their isomers. Examples of $C_1$-$C_4$-alkyl groups include, for example, methyl, ethyl, propyl, 1-methylethyl, butyl, 1-methylpropyl, 2-methylpropyl, and 1,1-dimethylethyl groups.

Cyclic alkyl groups or "cycloalkyl" groups include cycloalkyl groups having from 3 to 10 carbon atoms. Cycloalkyl groups can include a single ring, or multiple condensed rings. In some examples, cycloalkyl groups include $C_3$-$C_4$, $C_4$-$C_7$, $C_5$-$C_7$, $C_4$-$C_6$, or $C_5$-$C_6$ cyclic alkyl groups. Non-limiting examples of cycloalkyl groups include adamantyl, cyclopropyl, cyclobutyl, cyclopentyl, cyclohexyl, cycloheptyl, cyclooctyl and the like.

Alkyl and cycloalkyl groups can be unsubstituted or substituted with one or more moieties chosen from alkyl, halo, haloalkyl, hydroxyl, carboxyl, acyl, acyloxy, amino, alkyl- or dialkylamino, amido, arylamino, alkoxy, aryloxy, nitro, cyano, azido, thiol, imino, sulfonic acid, sulfate, sulfonyl, sulfanyl, sulfinyl, sulfamonyl, ester, phosphonyl, phosphinyl, phosphoryl, phosphine, thioester, thioether, acid halide, anhydride, oxime, hydrazine, carbamate, phosphoric acid, phosphate, phosphonate, or any other viable functional group that does not inhibit the biological activity of the compounds of the invention, either unprotected, or protected as necessary, as known to those skilled in the art, for example, as described in Greene, et al., *Protective Groups in Organic Synthesis*, John Wiley and Sons, Third Edition, 1999, hereby incorporated by reference.

Terms including the term "alkyl," such as "alkylamino" or "dialkylamino," will be understood to comprise an alkyl group as defined above linked to another functional group, where the group is linked to the compound through the last group listed, as understood by those of skill in the art.

The term "aryl," as used herein, refers to a monovalent aromatic carbocyclic group of from 6 to 14 carbon atoms. Aryl groups can include a single ring or multiple condensed rings. In some examples, aryl groups include $C_6$-$C_{10}$ aryl groups. Aryl groups include, but are not limited to, phenyl, biphenyl, naphthyl, tetrahydronaphtyl, phenylcyclopropyl and indanyl. Aryl groups can be unsubstituted or substituted by one or more moieties chosen from halo, cyano, nitro, hydroxy, mercapto, amino, alkyl, alkenyl, alkynyl, cycloalkyl, cycloalkenyl, haloalkyl, haloalkenyl, haloalkynyl, halocycloalkyl, halocycloalkenyl, alkoxy, alkenyloxy, alkynyloxy, haloalkoxy, haloalkenyloxy, haloalkynyloxy, cycloalkoxy, cycloalkenyloxy, halocycloalkoxy, halocycloalkenyloxy, alkylthio, haloalkylthio, cycloalkylthio, halocycloalkylthio, alkylsulfinyl, alkenylsulfinyl, alkynylsulfinyl, haloalkylsulfinyl, haloalkenylsulfinyl, haloalkynylsulfinyl, alkylsulfonyl, alkenylsulfonyl, alkynylsulfonyl, haloalkyl-sulfonyl, haloalkenylsulfonyl, haloalkynylsulfonyl, alkylamino, alkenylamino, alkynylamino, di(alkyl) amino, di(alkenyl)-amino, di(alkynyl)amino, or trialkylsilyl.

The term "alkoxy," as used herein, refers to alkyl-O—, wherein alkyl refers to an alkyl group, as defined above. Similarly, the terms "alkenyloxy," "alkynyloxy," and "cycloalkoxy," refer to the groups alkenyl-O—, alkynyl-O—, and cycloalkyl-O—, respectively, wherein alkenyl, alkynyl, and cycloalkyl are as defined above. Examples of $C_1$-$C_6$-alkoxy groups include, but are not limited to, methoxy, ethoxy, $C_2H_5$—$CH_2O$—, $(CH_3)_2CHO$—, n-butoxy, $C_2H_5$—$CH(CH_3)O$—, $(CH_3)_2CH$—$CH_2O$—, $(CH_3)_3CO$—, n-pentoxy, 1 methylbutoxy, 2-methylbutoxy, 3-methylbutoxy, 1,1-dimethylpropoxy, 1,2 dimethylpropoxy, 2,2-dimethyl-propoxy, 1-ethylpropoxy, n-hexoxy, 1 methylpentoxy, 2-methylpentoxy, 3-methylpentoxy, 4-methylpentoxy, 1,1 dimethylbutoxy, 1,2-dimethylbutoxy, 1,3-dimethylbutoxy, 2,2-dimethylbutoxy, 2,3 dimethylbutoxy, 3,3-dimethylbutoxy, 1-ethylbutoxy, 2-ethylbutoxy, 1,1,2 trimethylpropoxy, 1,2,2-trimethylpropoxy, 1-ethyl-1-methylpropoxy, and 1-ethyl-2-methylpropoxy.

The term "hydroxyl" as used herein is represented by the formula —OH.

"$R^1$," "$R^2$," "$R^3$," "$R^n$," etc., where n is some integer, as used herein can, independently, possess one or more of the groups listed above. For example, if $R^1$ is a straight chain alkyl group, one of the hydrogen atoms of the alkyl group can optionally be substituted with a hydroxyl group, an alkoxy group, an amine group, an alkyl group, a halide, and the like. Depending upon the groups that are selected, a first group can be incorporated within second group or, alternatively, the first group can be pendant (i.e., attached) to the second group. For example, with the phrase "an alkyl group comprising an amino group," the amino group can be incorporated within the backbone of the alkyl group. Alternatively, the amino group can be attached to the backbone of the alkyl group. The nature of the group(s) that is (are) selected will determine if the first group is embedded or attached to the second group.

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valences of the heteroatoms. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc.

It is understood that throughout this specification the identifiers "first" and "second" are used solely to aid in distinguishing the various components and steps of the disclosed subject matter. The identifiers "first" and "second" and the like are not intended to imply any particular order, amount, preference, or importance to the components or steps modified by these terms.

Reference will now be made in detail to specific aspects of the disclosed materials, compounds, compositions, articles, and methods, examples of which are illustrated in the accompanying Examples.

Compounds and Compositions

Disclosed herein are amide 7-carboxybenzo[1,2,3]thiadiazoles, derivatives thereof, combinations thereof, and compositions thereof. Amide 7-carboxybenzo[1,2,3]thiadiazole and derivatives thereof are disclosed in U.S. Pat. Nos. 5,190,928, 5,523,311, and 4,931,581, the disclosures of which are incorporated herein by reference. In some aspects, amide 7-carboxybenzo[1,2,3]thiadiazole or its derivatives can have a structure according to Formula I:

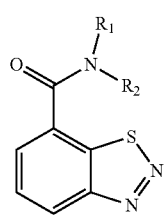

Formula I wherein $R_1$ and $R_2$ are independently selected from hydrogen, an aliphatic $C_1$-$C_{20}$ alkyl group, an aliphatic $C_1$-$C_{20}$ alkoxy group, wherein each of $R_1$ and $R_2$ optionally comprises one or more heteroatoms, an unsaturated bond, or an aryl group.

In some aspects, $R_1$ and $R_2$ are independently selected from hydrogen, a $C_1$-$C_{20}$ linear alkyl group, a $C_1$-$C_{20}$ linear alkoxy group, a $C_1$-$C_{20}$ branched alkyl group, a $C_1$-$C_{20}$ branched alkoxy group, a $C_1$-$C_{20}$ cyclic alkyl group, and a $C_1$-$C_{20}$ cyclic alkoxy group, wherein each of $R_1$ and $R_2$ optionally comprises one or more heteroatoms, an unsaturated bond, or an aryl group.

In certain aspects, $R_1$ and $R_2$ are independently selected from hydrogen, a $C_1$-$C_6$ linear alkyl group, and a $C_1$-$C_6$ linear alkoxy group. In some examples, $R_1$ and $R_2$ are independently selected from a methyl group or a methoxy group. For example, the compositions described herein can include N-methyl, N-methoxy-7-carboxybenzo[1,2,3]thiadiazole.

Depending on the intended mode of administration, the compositions described herein can be in the form of a solid, a semi-solid, a liquid, a solution, a suspension, an emulsion, a gel, an oil dispersion, capsule (such as the active ingredient encapsulated in a microcapsule), or the like. The compositions can include, as noted above, an agriculturally effective amount of the compound of Formula I in combination with an agriculturally acceptable carrier and, in addition, can include other carriers, adjuvants, diluents, thickeners, buffers, preservatives, surfactants, etc. In some aspects, concentrates, suitable for dilution, of the compositions can be prepared with the compositions, in addition to water, a wetting agent, a tackifier, a dispersant, or an emulsifier.

The agriculturally acceptable carrier can include an organic or an inorganic carrier. Exemplary carriers include, but are not limited to, water, organic solvents, inorganic solvents, petroleum fractions or hydrocarbons such as mineral oil, aromatic solvents, paraffinic oils, vegetable oils such as soybean oil, rapeseed oil, olive oil, castor oil, sunflower seed oil, coconut oil, corn oil, cottonseed oil, linseed oil, palm oil, peanut oil, safflower oil, sesame oil, tung oil, esters of the above vegetable oils, esters of monoalcohols or dihydric, trihydric, or other lower polyalcohols (4-6 hydroxy containing), such as 2-ethyl hexyl stearate, n-butyl oleate, isopropyl myristate, propylene glycol dioleate, di-octyl succinate, di-butyl adipate, di-octyl phthalate, esters of mono, di and polycarboxylic acids, toluene, xylene, petroleum naphtha, crop oil, acetone, methyl ethyl ketone, cyclohexanone, trichloroethylene, perchloroethylene, ethyl acetate, amyl acetate, butyl acetate, propylene glycol monomethyl ether and diethylene glycol monomethyl ether, methyl alcohol, ethyl alcohol, isopropyl alcohol, amyl alcohol, ethylene glycol, propylene glycol, glycerine, N-methyl-2-pyrrolidinone, N,N-dimethyl alkylamides, dimethyl sulfoxide, liquid fertilizers, and mixtures thereof. Other exemplary carriers include silicas, silica gels, silicates, talc, kaolin, limestone, lime, chalk, bole, loess, clay, dolomite, diatomaceous earth, calcium sulfate, magnesium sulfate, magnesium oxide, ground synthetic materials, pyrophyllite clay, attapulgus clay, kieselguhr, calcium carbonate, bentonite clay, Fuller's earth, cottonseed hulls, wheat flour, soybean flour, pumice, wood flour, walnut shell flour, lignin, ammonium sulfate, ammonium phosphate, ammonium nitrate, ureas, cereal meal, tree bark meal, wood meal and nutshell meal, cellulose powders, and mixtures thereof. The agriculturally acceptable carrier can be present in an amount of 99.9% by weight or less, 99% by weight or less, 98% by weight or less, 97% by weight or less, 95% by weight or less, 90% by weight or less, 85% by weight or less, 80% by weight or less, 75% by weight or less, 70% by weight or less, 65% by weight or less, 60% by weight or less, 55% by weight or less, 50% by weight or less, 45% by weight or less, or 40% by weight or less, based on the weight of the composition.

Exemplary agriculturally acceptable adjuvants include, but are not limited to, antifreeze agents, antifoam agents, compatibilizing agents, sequestering agents, neutralizing agents and buffers, corrosion inhibitors, colorants, odorants, penetration aids, wetting agents, spreading agents, dispersing agents, thickening agents, freeze point depressants, antimicrobial agents, crop oil, safeners, adhesives, surfactants, protective colloids, emulsifiers, tackifiers, and mixtures thereof. The agriculturally acceptable adjuvant can be present in an amount of 15% by volume or less, 10% by volume or less, or 5% by volume or less, based on the volume of the composition.

The compositions described herein can be in any suitable form based on its intended use. In some aspects, the compositions can be in the form of an aqueous solution. In some aspects, the compositions can be a solution comprising an organic solvent, such as an alcohol. In some aspects, the compositions can be a solution comprising a mixture of organic and inorganic solvents. For example, the composition can include water and an alcohol. The ratio of the organic and inorganic solvents in the mixture can be from 1:1000 to 1000:1. In some examples, the composition can include a mixture of water and an alcohol, wherein the water is in an amount of from 0.01% to 100% by volume of the mixture. In some aspects, the compositions can be in the form of an emulsion. The emulsion can include the compound of Formula I encapsulated and suspended in a solution.

The compositions described herein can include an additional plant protection composition. For example, the compositions can include a fungicidal agent, an antiviral agent, an antibacterial agent, or a combination thereof.

The compositions described herein can comprise from 0.001 to 99% by weight of active compound, that is the compound of Formula I, together with the carriers and/or adjuvants. In some embodiments, the compositions can be in the form of a solution having a concentration of 0.001 mg/L or greater of the active compound. For example, the compositions can comprise from 0.001 mg/L to 900 mg/L, from 0.01 mg/L to 800 mg/L, from 0.01 mg/L to 700 mg/L, from 0.01 mg/L to 500 mg/L, from 0.01 mg/L to 300 mg/L, from 0.01 mg/L to 100 mg/L, from 0.1 mg/L to 500 mg/L, from 0.1 mg/L to 300 mg/L, from 0.1 mg/L to 200 mg/L, or from 0.1 mg/L to 100 mg/L, of the active compound. In some embodiments, the compositions can be in the form of a solution having a concentration of 900 mg/L or less of the active compound.

Methods

As discussed herein, the compositions described herein can be used as a plant stimulant. The compositions can include a carboxybenzo[1,2,3]thiadiazole or derivatives thereof as described herein, or as described in U.S. Pat. Nos. 5,190,928, 5,523,311, and 4,931,581. The term "plant" as used herein includes whole plants and parts thereof, including, but not limited to, shoot vegetative organs/structures (e.g., leaves, stems and tubers), roots, flowers and floral organs/structures (e.g., bracts, sepals, petals, stamens, carpels, anthers and ovules), seed (including embryo, endosperm, and seed coat) and fruit (the mature ovary), plant tissue (e.g., vascular tissue, ground tissue, and the like) and cells (e.g., guard cells, egg cells, and the like), and progeny of same. The class of plants that can be used in the methods described herein include the class of higher and lower plants, including angiosperms (monocotyledonous and dicotyledonous plants), gymnosperms, ferns, horsetails, psilophytes, lycophytes, bryophytes, and multicellular algae. For example, plants for use in the methods described herein include any vascular plant, for example monocotyledons or dicotyledons or gymnosperms, including, but not limited to alfalfa, apple, Arabidopsis, banana, barley, canola, castor bean, chrysanthemum, clover, cocoa, coffee, cotton, cottonseed, corn, crambe, cranberry, cucumber, dendrobium, dioscorea, eucalyptus, fescue, flax, gladiolus, liliacea, linseed, millet, muskmelon, mustard, oat, oil palm, oilseed rape, papaya, peanut, pineapple, ornamental plants, Phaseolus, potato, rapeseed, rice, rye, ryegrass, safflower, sesame, sorghum, soybean, sugarbeet, sugarcane, sunflower, strawberry, tobacco, tomato, turfgrass, wheat and vegetable crops such as lettuce, celery, broccoli, cauliflower, cucurbits, onions (including garlic, shallots, leeks, and chives); fruit and nut trees, such as apple, pear, peach, orange, grapefruit, lemon, lime, almond, pecan, walnut, hazel; vines, such as grapes, kiwi, hops; fruit shrubs and brambles, such as raspberry, blackberry, gooseberry; forest trees, such as ash, pine, fir, maple, oak, chestnut, popular; with alfalfa, canola, castor bean, corn, cotton, crambe, flax, linseed, mustard, oil palm, oilseed rape, peanut, potato, rice, safflower, sesame, soybean, sugarbeet, sunflower, tobacco, tomato, and wheat preferred. In some embodiments, plants for use in the methods described herein include any crop plant, for example, forage crop, oilseed crop, grain crop, fruit crop, vegetable crop, fiber crop, spice crop, nut crop, turf crop, sugar crop, beverage crop, and forest crop.

The term "plant stimulant," as used herein refers to a substance or microorganism applied to plants under conditions that enhance nutrition efficiency, stress tolerance, and/or crop quality traits, regardless of its nutrition content. Particularly, plant stimulants are used in the cultivation of plants in order to improve the growth and development processes. The impact of stimulants on plants is not due to direct participation in the regulation of life processes, but the effect on metabolism in the broad sense of this word. They can stimulate the synthesis of natural hormones, and sometimes increase their activity, can improve intake of minerals from the soil, regulate the growth of roots. In addition, they can cause the increase of the resistance to adverse conditions (biotic or abiotic). The use of stimulants in the cultivation of plants increases the yields, often while increasing their quality at the same time. Stimulants can enhance life processes occurring in plants without changing plants natural behavior. The compositions described herein are plant stimulants and therefore can be used as plant growth regulators, plant metabolic processes regulators, plant physiological processes regulators, a substance that prevents against the effects of biotic or abiotic stress in a plant, and/or a substance that provides multiple disease resistance to a plant. The compositions can be used as a plant stimulant for either healthy and unhealthy plants, or plants in both healthy and unhealthy environments.

As discussed herein, U.S. Pat. Nos. 5,190,928 and 5,523,311 describes the use of benzo[1,2,3]thiadiazole derivatives as immunizing agents for plants against attack by phytopathogenic microorganisms or viruses. However, the use of these compounds as plant stimulants, such as a plant growth regulator, is not known. In particular, one of ordinary skill in the art understands an immunizing agent to be different from a plant stimulant. For example, an immunizing agent is generally applied once to the organism (plant or animal) to provide immunity to a particular disease for the rest of the life of the organism. In contrast, a plant stimulant is generally applied multiple times throughout the life of the plant as it must continually stimulate the plant in order for the plant to exhibit desired function, for example, every 5 to 14 days.

In some aspects, the compositions described herein can be used to protect plants against biotic stress caused by an infection from a virus. Viruses (lat. Virus—poison, venom) are complex organic molecules without cellular structure although composed of proteins and nucleic acids. They contain genetic material in the form of RNA (RNA viruses), or DNA. According to the André Lwoff definition, the virus is "infectious, potentially pathogenic nucleoproteide, existing only in the form of a single nucleic acid which reproduces genetic material. Is unable to divide outside the cell, and does not usually have enzymes and therefore do not exhibit metabolism." According to an online Merriam-Webster dictionary, life is the "state of the organism characterized by the ability to metabolism, growth, reactions to stimuli, and reproduction." Viruses do not have metabolism and are unable to grow and reproduce without the host, which does not allow to qualify them as living organisms (as well as microorganisms).

In some aspects, the compositions described herein can be used to protect plants against biotic stress caused by living organisms, such as fungi, bacteria, nematodes, insects, mites, and animals; stimulate seeds during germination; protect plants against abiotic stress caused by a physical or chemical stressor of non-living origin such as the presence of harmful chemicals including salts, restricted access to water, sunscald, freeze injury, wind injury, nutrient deficiency, or improper cultural practices, such as overwatering or planting too deep; and/or provide multiple disease resistance to a plant. The compositions described herein provides plants' resistance to a diverse range of pathogens. Without wishing to be bound by theory, this broad range of plants' resistance indicate that the compositions provide stimulation via one or more general mechanisms, and is not microorganism-selective.

In some aspects, the compositions can be used as a plant stimulant for plants that has a disease caused by a pathogenic agent. The pathogenic agent can include a fungus, virus, bacterium, mycoplasm, spiroplams or viroid. Exemplary pathogens may include fungi, such as *Erisyphe polygoni*, *Phytophthora capsicci*, *Verticillium dahliae* and other *Verticillium* spp., Powdery mildew, and *Fusarium* spp.; bacteria, such as *Pseudomonas syringae* py. tomato, and viruses, such as tobacco mosaic virus and brome mosaic virus. Other exemplary pathogens include *Colletotrichum lagenarum*, *Pyricularia oryzae*, *Pseudomonas lachrymans*, *Xanthomonas oryzae*, *Xanthomonas vesicatoria*, *Phytophthora infestants* on tomatoes, *Plasmopara viticola*, *Pseudomonas tomato*, *Phytophthora parasitica* var. *nicotiniae*, *Peronospora tabacina*, *Cercospora nicotianae*, *Pseudomonas tabaci*, *Erysiphe graminis*, *Phytophora medicaginis*, *P. megasperma*, *Pyricularia oryzae*, *Helminthosporium* leaf blight such as *Helminthosporium oryzae*, *Cochliobolus miyabeanus*, Bakanae disease such as *Gibberella fujikuroi*, seedling blight such as *Rhizopus oryzae*, sheath blight such as *Rhizoctonia solani*, *Puccinia coronata*, powdery mildew such as *Erysiphe graminis*, *Rhynchsporium secalis*, *Cochliobolus sativus*, *Helminthosporium gramineum*, *Pyrenophora gramineum*, *Pyrenophra teres*, *Tilletia caries*, *Ustilago nuda*, *Leptosphaeria nodorum*, *Septoria nodorum*, *Puccinia striiformis*, *Typhula incamata*, *Pseudocercosporella herpotrichoides*, *Calonectria graminicola*, *Fusarium nivale*, *Puccinia graminis*, *Typhula ishikariensis*, *Puccinia recondita*, *Puccinia triticina*, *Helminthosporium gramineum*, *Ustilago tritici*, *Pythium debaryanum*, *Fusarium nivale*, *Phytophthora infestans*, *Peronospora tabacina*, *Phytophthora parasitica* var, mosaic disease, *Pythium debaryanum*, *Rhizoctonia solani*, *Pythium aphanidermatum*, *Botrytis cinerea*, *Botrytis cinerea*, *Mycosphaerella arachidicola*, *Rosellinia nectrix*, *Alternaria* leaf spot, and other diseases of grains, cereals, beet, leguminous plants, pomes, drupes, fruits, citrus fruit, oil plants, cucumber plants, fiber plants, lauraceae, ornamentals, and vegetables such as oil-seed rape, sunflower, carrot, pepper, strawberry, melon, kiwi fruit, onion, leek, sweet potato, fig, ume, asparagus, persimmon, soybean, adzuki-bean, watermelon, crown daisy, spinach, lettuce, asparagus, cabbages, carrots, onions, tomatoes, potatoes, paprika, tea, wheat, barley, rye, oats, rice, sorghum, sugar beet, fodder beet, apples, pears, plums, peaches, almonds, cherries, strawberries, raspberries, blackberries, beans, lentils, peas, soybeans, rape, mustard, poppy, olives, sunflowers, coconut, castor oil plants, cocoa beans, groundnuts, cucumber, marrows, melons, cotton, flax, hemp, jute, oranges, lemons, grapefruit, mandarins, avocados, cinnamon, camphor, maize, tobacco, nuts, coffee, sugar cane, tea, vines, hops, bananas, natural rubber plants, flowers, shrubs, deciduous trees and conifers, and such the like.

Methods of using the compositions as a plant stimulant are also described herein. The method can include contacting a plant with an effective amount of a composition comprising a compound according to Formula I. The plant, including its roots, flowers, leaves, or stems, can be contacted with the disclosed compounds or compositions in any known technique for applying plant stimulants. Exemplary application techniques include, but are not limited to, spraying, atomizing, dusting, spreading, sprinkling, dripping, dipping, drenching, injecting, hydrophonics, or direct application into water (in-water). The method of application can vary depending on the intended purpose. The compositions can be applied on the plants in a field or in a greenhouse. In some aspects, the compositions can be applied to a portion of the plant, for example, to the tubers before planting.

The composition can be contacted with any part of the plant, for example, the root or the leaves of the plant. In some embodiments, the composition can be contacted to the roots by spraying the soil, mechanical incorporation, mixed with fertilizer, soil improvement, pre-mix or such the like.

The selected dosage level of the composition will depend upon a variety of factors including for example, the activity of the compound according to Formula I, the route of administration, the time of administration, the duration of the treatment, other drugs and/or materials used in combination with the particular compound employed, the condition and general health of the plant being treated, and like factors well-known in the agricultural arts. However, the compositions described herein provides plant stimulation even at low doses. In some embodiments, the compositions can be applied at a rate of from 0.001 g ai/ha to 900 g ai/ha. For example, the compositions can be applied at a rate of from 0.01 g ai/ha to 100 g ai/ha. In some embodiments, wherein the compositions disclosed herein are less well tolerated by certain crop plants, the compositions can be applied with the aid of the spray apparatus in such a way that they come into little contact, if any, with the leaves of the sensitive crop plants while reaching the leaves of undesirable vegetation that grows underneath or the bare soil (e.g., post-directed or lay-by). A person having ordinary skill in the art can readily determine and prescribe the effective amount of the composition required.

The compositions described herein can be contacted intermittently to the plant. In some aspects, the plant can be contacted with the composition two times of greater. For example, the plant can be contacted with the composition 3, 4, 5, 6, 7, 8, 9, or 10 times. In some embodiments, the plant can be contacted with the composition from 2 to about 5 times. In some embodiments, the plant can be contacted with the composition once. In some aspects, the plant can be contacted with the composition once every 5 to 21 days. For example, the plant can be contacted with the composition once every 5, 6, 7, 8, 9, 10, 11, 12, 13, 14, 15, 16, 17, 18, 19, 20, or 21 days. In some embodiments, the plant can be contacted with the composition once per week. In some aspects, the plant can be contacted with the composition 1 to 5 times per 5 to 21 days. For example, the plant can be contacted about 1 to about 5 times per week.

In some aspects the compositions described herein can be applied before the stressing factor(s) appears.

The compositions can used in combination with an additional plant protection product. For example, the composition can be used with a fungicidal agent, an antiviral agent, or an antibacterial agent. The composition comprising a compound of Formula I and the fungicidal agent, antiviral agent, or antibacterial agent can be applied to the plant simultaneously or sequentially. In some embodiments, the fungicidal agent, antiviral agent, or antibacterial agent is applied to the plant after the composition comprising a compound of Formula I.

In some aspect, the fungicidal agent, antiviral agent, or antibacterial agent and the compound of Formula I are applied in a synergistically effective amount. As described in the Herbicide Handbook of the Weed Science Society of America, Ninth Edition, 2007, p. 429, "'synergism' [is] an interaction of two or more factors such that the effect when combined is greater than the predicted effect based on the response to each factor applied separately." Synergistic in the herbicide context can mean that the use of the fungicidal agent, antiviral agent, or antibacterial agent and the compound of Formula I results in an increased stimulating effect compared to the stimulating effects that are possible with the use of each compound alone. In some embodiments, the fungicidal agent, antiviral agent, or antibacterial agent is applied at a rate of 50% or less the recommended rate. For example, the fungicidal agent, antiviral agent, or antibacterial agent is applied at a rate of 45% or less, 40% or less, 35% or less, or 33% or less the recommended rate.

In some aspects, the method of stimulating a plant can include applying a fungicidal agent and a composition comprising a compound of Formula I. The fungicidal agent can include a triazole fungicide. For example, the fungicidal agent can include an (RS)-1-(4-chlorophenyl)-4,4-dimethyl-3-(1H, 1,2,4-triazol-1-ylmethyl)pentan-3-ol fungicide which is sold under the name Tebuconazole. The recommended dose for Tebuconazole is 250 g/ha when applied alone. In some embodiments, the fungicidal agent (such as Tebuconazole) can be applied in an amount of 150 g/ha or less (e.g., 130 g/ha or less, 125 g/ha or less, 120 g/ha or less, 110 g/ha or less, 100 g/ha or less, 95 g/ha or less, 90 g/ha or less, or 85 g/ha or less). In some embodiments, the fungicidal agent can be applied in an amount of from 80 g/ha to 150 g/ha such as from 83 g/ha to 125 g/ha. In some embodiments, the compound according to Formula I can be applied in an amount of from 0.01 g ai/ha to 100 g ai/ha. In some embodiments, the weight ratio of the fungicidal agent to the compound according to Formula I can be from 1:1 to 500:1, such as from 1:1 to 250:1, from 1:1 to 100:1, or from 1:1 to 50:1.

EXAMPLES

The following examples are set forth below to illustrate the compositions, methods, and results according to the disclosed subject matter. These examples are not intended to be inclusive of all aspects of the subject matter disclosed herein, but rather to illustrate representative methods, compositions, and results. These examples are not intended to exclude equivalents and variations of the present invention, which are apparent to one skilled in the art.

Efforts have been made to ensure accuracy with respect to numbers (e.g., amounts, temperature, etc.) but some errors and deviations should be accounted for. Unless indicated otherwise, parts are parts by weight. There are numerous variations and combinations of reaction conditions, e.g., component concentrations, temperatures, pressures, and other reaction ranges and conditions that can be used to optimize the product purity and yield obtained from the described process. Only reasonable and routine experimentation will be required to optimize such process conditions.

Example 1

BTHWA Effect on the Infectivity of Tobacco Mosaic Virus (TMV)

Purified tobacco mosaic virus (TMV) at a concentration of approx. 3 µg/ml was mixed with N-methyl-N-methoxy-7-carboxybenzo[1,2,3]thiadiazole amide (BTHWA) formulation (concentration 40 mg/L) in a 1:1 volume ratio and incubated for 30 min at room temperature (treated leaves). The control was TMV incubated in water. Both virus suspensions were used to mechanically infect tobacco leaves cv. Xanthi. Local necrotic spots (hypersensitivity, local infection) produced on the tobacco leaves were measured.

After 5 days, the number of spots on the control and treated leaves differed by only 12%, which leads to the conclusion that the compound does not act directly on the infectivity of TMV.

Example 2

BTHWA Effect on the Infectivity of Bacteria (Pseudomonas syringe pv. Tomato)

The procedure as described in Example 1 was followed, however, the bacterium Pseudomonas syringe pv. Tomato was used. The suspensions formed were incubated in a Mueller-Hinton broth nutrition medium. After 2 days, the concentration of bacteria on the treated plates was compared to the control. The growth differences between the control medium and the treated medium was determined to be <5%, which led to the conclusion that the BTHWA solution did not directly affect the infectivity of bacteria.

Example 3

BTHWA Effect on the Infectivity of Fungi (Powdery Mildew)

The procedure as described in Example 1 was followed, however, a powdery mildew fungi was used, which was then incubated in a nutrition medium. After 2 days, the differences in fungal growth on the treated plates and control were determined to be <5%, which led to the conclusion that the compound solution did not directly affect the infectivity of fungi.

Example 4

Protection of Plants by Watering with Solution Containing BTHWA Against Biotic Stress in Tobacco (Nicotiana tabacum) cv. Xanthi Caused by Viral Infection of Tobacco Mosaic Virus Tobacco plants (Nicotiana tabacum) cv. Xanthi at the stage of three developed leaves was watered (i.e. applied to the roots) twice with BTHWA solution of 10 mg/L, in one-week intervals. Control tobacco plants were irrigated with water only. A week after the second plant treatment with the solution of active compound, the leaves were mechanical infected with tobacco mosaic virus (TMV) repeatedly by rubbing the leaves with carborundum steeped in a suspension of the purified virus at a concentration of approx. 2 µg/ml. To assess the biological effectiveness in protecting plants against biotic stress, the TMV-tobacco cv. Xanthi model was used. This pathogen-plant model includes determining the hypersensitivity interaction phenomena with formation of necrotic spots which are quantifiable. A comparison of the number of spots on the leaves of the control plants and plants treated with BTHWA showed that application of the formulation to the roots of tobacco plants restricts the influence of biotic factor—viral infection—on the plant (FIG. 1).

Example 5

Protection of Plants by Spraying with Solution Containing BTHWA Against Biotic Stress in Tobacco (Nicotiana tabacum) cv. Xanthi Caused by Viral Infection of Tobacco Mosaic Virus The procedure as described in Example 4 was followed, however the plants were treated by spraying (i.e. applied to the leaves) twice, at weekly intervals, with the BTHWA solution at a concentration of 10 mg/L. It was shown that BTHWA protected the treated leaves against biotic stress caused by TMV infection.

Example 6

Protection of Plants by Spraying with Solution Containing BTHWA Against Biotic Stress in Tobacco (*Nicotiana tabacum*) cv. *Xanthi* Caused by Viral Infection of Tobacco Mosaic Virus in Reference to Comparative Material, Commercially Available BION™

Tobacco plants (*Nicotiana tabacum*) cv. *Xanthi* at the stage of three developed leaves were sprayed once with BION™ or BTHWA solutions at a concentration of 20 mg/L. A week later, the plants were mechanically infected with TMV virus by repeatedly rubbing the leaves with carborundum steeped in a suspension of the purified virus at the concentration of approx. 2 µg/ml. The level of protection against biotic stress was assessed by comparing the number of necrotic spots caused by TMV on the leaves of plants treated by BTHWA or BION™ and compared to the control (plant sprayed with water only). Research shows that even at a concentration of 20 mg/L, BTHWA was more effective in preventing the occurrence of biotic stress.

Table 1 shows the number of necrotic spots caused by virus infection in plants exposed to BTHWA or BION™ compared to the control. Reduction of the amount of necrotic spots indicates protection against influence of the biotic factor on the plant. Table 1

| Sample | Average number of the local necrotic spots per leaf | Reduction of necrotic spots [%] |
| --- | --- | --- |
| Control | 232 | — |
| BTHWA, 20 mg/L | 0 | 100 |
| BION, 20 mg/L | 40.4 | 82.6 |

Example 7

Study of the Durability of the Plant Protection Effect by Watering with Solution Containing BTHWA Against Biotic Stress in Tobacco (*Nicotiana tabacum*) cv. *Xanthi* Caused by Viral Infection of Tobacco Mosaic Virus The procedure as described in Example 4 was followed, however, the treated and control plants were divided into three batches and their leaves were inoculated with a virus, respectively after 1, 2, and 3 weeks past the last treatment with BTHWA or water only. The results showed that protection against biotic stress caused by TMV infection was effective after three weeks of watering the plants with a solution of BTHWA and that the protection also was observed at 6-7$^{th}$ level of leaves. A similar effect occurred in the case of spraying.

Example 8

Determination the Dose of Active Substance in Protection of Plants by Spraying with Solution Containing BTHWA Against Biotic Stress in Tobacco (*Nicotiana tabacum*) cv. *Xanthi* Caused by Viral Infection of Tobacco Mosaic Virus Experiments were carried out on a model tobacco plant (*Nicotiana Tabacum* var. *Xanthi*) under greenhouse conditions, where the plant was in the three-developed leaves phase. The plants were sprayed (with full coverage of the leaves surface) with a solution of a working fluid having a concentration of active substance (BTHWA) starting from 5 and ending at 1000 mg/L. The phytotoxicity of the BTHWA was evaluated. When the BTHWA in the working fluid was in a concentration above 100 mg/L, phytotoxic effects were observed in the form of yellowing of the leaves, necrosis of leaves, and growth inhibition. At lower concentrations, no phytotoxicity effects were observed.

After six days, plants treated with a solution of the working fluid at a BTHWA concentration<100 mg/L were inoculated with tobacco mosaic virus (TMV) in order to determine the degree of induction of resistance caused by the formulation. After another 4 days of infection by TMV, the level of infection was evaluated by determining the number and size of necrotic spot caused by viral disease on the plant leaves relative to the control. The results (as shown in Table 2), show that the lowest possible concentration of active BTHWA at which the efficiency is maintained at greater than 90% is 10 mg/L.

TABLE 2

3Effect of BTHWA concentration in the operational fluid on the induction of immunity and phytotoxicity

| | Concentration of active substance | | | | | | | |
| --- | --- | --- | --- | --- | --- | --- | --- | --- |
| | 5 mg/L control | 10 mg/L | 20 mg/L | 50 mg/L | 100 mg/L | 250 mg/L | 500 mg/L | 1000 mg/L |
| Observed phytotoxicity | − | − | − | − | + | + | + | + |
| Resistance induction [%]* | 85% | 97% | 97% | 98% | − | − | − | − |

*Reduction of necrotic spots related to control

Example 9

Study of the Durability of the Plant Protection Effect by Watering Plants with Solution Containing BTHWA Against Biotic Stress in Tobacco (*Nicotiana tabacum*) cv. *Xanthi* Caused by Viral Infection of TMV Virus Research on the durability of the induced resistance effect on the model of tobacco plants against TMV virus was performed. The study demonstrated how long the effect of induction of resistance was present in plants after the plants were watered one time with 100 ml of solution at the concentration of active substance of 20 mg/L. The test plants which were watered with the solution containing BTHWA active substance were then watered only with clean water. The group of plants were then infected with the virus after 1, 3, 6, 10, 15, 20, 25 and 30 days (Table 3). The effect of the induction of resistance was observed by reduction of number and size of necrotic spots present on the leaves of the plant relative to the control. As shown in Table 3, in the case of tobacco plants, application of the active substance caused activation of resistance in a plant after at least three days and this effect persisted for up to 25 days after a single application.

TABLE 3

Durability of the resistance induction effect

| | % of induction* Day of virus inoculation after active substance application | | | | | | | |
|---|---|---|---|---|---|---|---|---|
| | 1 day | 3 days | 6 days | 10 days | 15 days | 20 days | 25 days | 30 days |
| Control | 0% | 0% | 0% | 0% | 0% | 0% | 0% | 0% |
| BTHWA | <10% | 10-20% | 94% | 96% | 95% | 95% | 91% | 85% |

*reduction of necrotic spots related to control

Example 10

Protection of Plants by Watering with Solution Containing BTHWA Against Biotic Stress in Winter Barley Caused by the Infection of Oat Mosaic Virus (Brome Mosaic Virus BMV)

Barley plants in pots of 10 cm diameter were watered twice in weekly intervals with 70 ml of a BTHWA solution at a concentration of 20 mg/L. Control barley plants were treated with water only. One week after the second application of BTHWA, in each plant, one young developed leaf was sprinkled with carborundum to obtain small scratches, which helped in the virus infection. Infection was performed by mechanical application of purified BMV suspension, at the virus concentration of approx. 10 μg/L. Two weeks later, on the basis of the disease symptoms it was found that compared to control all treated barley plants showed no presence of biotic stress effects.

Example 11

Effect of BTHWA Concentration on the Effectiveness of Plant Protection Against Biotic Stress in Barley Caused by the Infection of Oat Mosaic Virus (Brome Mosaic Virus BMV)

The procedure as described in Example 10 was followed, however, the plants were treated (watered) with a solution of BTHWA at a concentration of 10 mg/L. BTHWA at lower concentration also prevented a biotic stress caused by BMV infection (65%).

Example 12

Protection of Plants by Watering with Solution Containing BTHWA Against Biotic Stress in Tobacco (*Nicotiana tabacum*) cv. *Xanthi* Caused by Bacterial Infection of *Psudomonas syringe* pv. Tomato Tobacco plants at the 3 developed leaves stage were watered (applied at the roots) twice in weekly intervals with BTHWA solution at a concentration of 20 mg/L. Control tobacco plants were irrigated with water only. One week after the second treatment, a *Psudomonas syringe* pv. tomato bacterial suspension, at a concentration of $10^5$ CFU/cm$^3$ was transferred to the leaf by using an insulin syringe (without a needle). The bacterial suspension was prepared from two-day *syringe* pv. tomato culture on a solid medium. Protection against biotic stress was evaluated based on the amount of bacterial growth in the leaves at the point of introduction followed by the formation of necrotic spots, and this was compared with the control. Bacterial infection and thus formation of necrotic spots were observed in the control, however, these effects were not observed in the plants treated with BTHWA.

Example 13

Protection of Plants by Spraying with Solution Containing BTHWA Against Biotic Stress in Tobacco (*Nicotiana tabacum*) cv. *Xanthi* Caused by Bacterial Infection of *Psudomonas syringe* pv. Tomato The procedure as described in Example 12 was followed, however, the plants were sprayed (applied to the leaves). The BTHWA solution was at a concentration of 20 mg/L. Spraying plants twice in weekly intervals prevents biotic stress and fully protects the plants against the effects of bacterial infection.

Example 14

Effect of BTHWA Concentration on the Effectiveness of the Protection of Plants by Spraying or Watering with Solution Containing BTHWA Against Biotic Stress in Tobacco (*Nicotiana tabacum*) cv. *Xanthi* Caused by Bacterial Infection of *Psudomonas* Syringe pv. Tomato The procedures as described in Examples 12 and 13 were followed, however the BTHWA formulation was used at a concentration of 10 mg/L. The solution applied by watering or spraying prevented biotic stress from occurring, completely protecting the treated plants from the effects of bacterial infection.

Example 15

Protection of Plants by Watering with Solution Containing BTHWA Against Biotic Stress in Tomato Caused by Elevated Concentration of Bacterial Cells *Psudomonas syringe* pv. Tomato The procedure as described in Example 12 was followed, however, the effectiveness of BTHWA in protecting plants against biotic stress was tested against the bacterial cell concentration raised to approx. $10^6$ CFU/cm$^3$. Even at the high concentration of *Psudomonas syringe* pv. tomato bacteria, plants treated with BTHWA showed negligible activity. In particular, no local necrotic spots were observed as a characteristic effect of bacterial growth and thus, this shows that the effects of infection were inhibited.

Example 16

Protection of Plants by Watering with Solution Containing BTHWA Against Biotic Stress in Tomato Caused by Bacterial Infection of *Psudomonas syringe* pv. Tomato Tomato plants in the phase of first pair of developed true leaves were watered twice with BTHWA at a concentration of 20 mg/L, at a weekly interval. Control tomato plants were treated with water only. One week after the second treatment *Psudomonas syringe* pv. tomato bacterial suspension at a concentration of $10^5$ CFU/cm$^3$ was introduced to the leaf using an insulin syringe (without a needle). Bacterial suspension was prepared from two-day *Psudomonas syringe* pv. tomato culture on solid medium. Protection against biotic stress was evaluated based on the amount of bacterial growth in the leaves at the point of introduction followed by the formation of necrotic spots, and this compared with the control. As a result of the application of BTHWA on the treated plants, bacterial infection and thus formation of necrotic spots, similar to those observed in the control, were not observed.

Example 17

Protection of Tomato Lycopersicon Esculentum Mill by Spraying with Solution Containing BTHWA Against Biotic Stress Caused by Bacterial Infection of *Psudomonas syringe* pv. Tomato The procedure as described in Example 16 was followed, however, the plants were sprayed. BTHWA at the concentration of 20 mg/L was applied twice by spraying. Application of BTHWA prevented biotic stress, fully protecting plants against the effects of bacterial infection.

Example 18

Protection of Tomato Lycopersicon Esculentum Mill by Watering with Solution Containing BTHWA Against Biotic Stress Caused by Fungal Infection of Powdery Mildew Tomato plants in the phase of first pair of developed true leaves were watered twice with BTHWA at a concentration of 20 mg/L, at a weekly interval. Control tomato plants were treater with water only. One week after the second treatment with BTHWA, Powdery mildew fungi suspension was introduced to the leaf using an insulin syringe (without a needle). The suspension was prepared from a culture in solid medium solid.

Protection against biotic stress was evaluated based on comparing the area of the leaves infected by the fungi. As a result of the application of BTHWA on the treated plants, fungal infection and formation of infected areas were not observed, in contrast to that observed in the control.

Example 19

Figure 2:
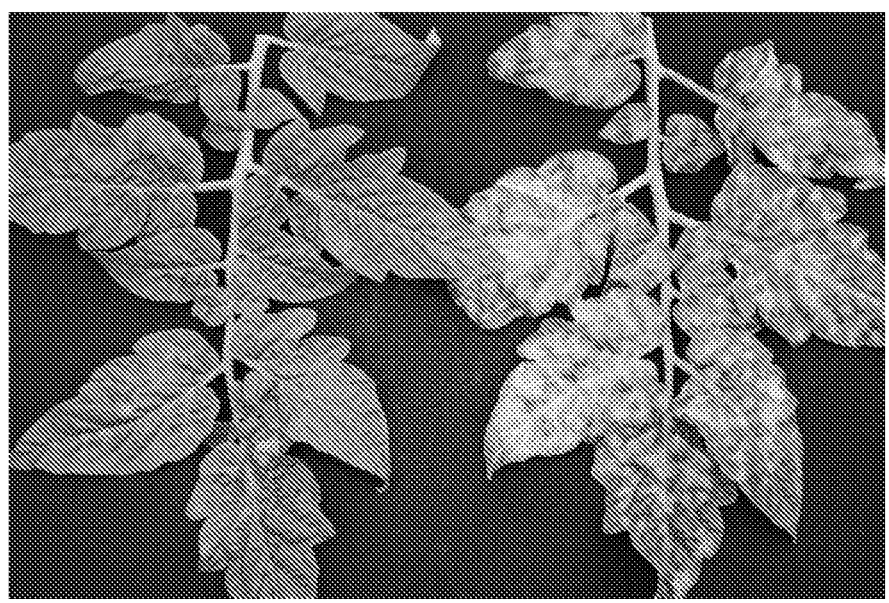
FIG. 2 is an image showing a tomato leaves after 5 days post infection with Powdery mildew (the leaf was previously treated with BTHWA and infected with Powdery mildew at 7 days post treatment) (left) and the untreated tomato leaves, 5 days post infection with Powdery mildew (control; right).

Protection of Tomato Lycopersicon Esculentum Mill by Spraying with Solution Containing BTHWA Against Biotic Stress Caused by Fungal Infection of Powdery Mildew The procedure as described in Example 18 was followed, however, the plants were sprayed. BTHWA at a concentration of 20 mg/L was applied twice by spraying and as a result it prevented biotic stress, fully protecting plants against the effects of fungal infection (FIG. 2).

Example 20

Effect of BTHWA Concentration on the Effectiveness of Protection Against Biotic Stress in Tomato Caused by Fungal Infection of Powdery Mildew The procedures as described in Examples 18 and 19 were followed, however, the solution of BTHWA was used at a concentration of 10 mg/L. The solution used for watering and spraying of the plants prevented plants from biotic stress, almost completely securing plants from the effects of fungal infection.

Example 21

Influence of BTHWA on Germination of Radish Seeds

Radish seeds were placed in water-containing solution of BTHWA at a concentration of 10 mg/L or water only (control samples). After 2 days, the weight gain of sprouts was examined to verify that the substance had a positive effect on the germination. As a result of using BTHWA, the mass of the germ increased by 5% in comparison to control, which showed that BTHWA acted as a growth stimulator as it accelerates the process of seed germination.

Example 22

Protection of Plants by Watering with Solution Containing BTHWA Against Abiotic Stress in Tomato Caused by Herbicide Tomato plants in the phase of first pair of developed true leaves were watered twice with BTHWA at concentration of 20 mg/L, at a weekly intervals. Control tomato plants were treated with water only. One week after the second watering of plants, the plants were exposed to a stress factor in the form of an herbicide (glyphosate at a dose of 0.005% aqueous solution). 10 days after herbicide application, plants treated with BTHWA exhibited lesser negative effect (by 30%) when treated with the herbicide, compared to the control.

Example 23

Protection of Plants by Watering with Solution Containing BTHWA Against Abiotic Stress in Tobacco Caused by Herbicide Tobacco plants (*Nicotiana tabacum*) var. *Xanthi* at the stage of 3 developed leaves were watered twice with solution of BTHWA at concentration of 20 mg/L, at a weekly interval. Control tomato plants were treated with water only. One week after the second watering of plants the plants were exposed to a stress factor in the form of an herbicide (glyphosate at a dose of 0.005% aqueous solution). 10 days after herbicide application, plants treated with BTHWA exhibited lesser negative effect (by 26%) when treated with the herbicide as compared to the control.

Example 24

Protection of Plants by Watering with Solution Containing BTHWA Against Abiotic Stress in Tomato Caused by Lack of Water Tomato plants in the phase of first pair of developed true leaves were watered twice with BTHWA at concentration of 20 mg/L, at a weekly intervals. Control tomato plants were treated with water only. A week after the second treatment, plants were exposed to a stress factor in the form of lack of access to water. Compared to the control, 10 days after cessation of watering, the total mass of the plants untreated by BTHWA was 10% lower than the weight of the treated plants.

Example 25

Protection of Plants by Watering with Solution Containing BTHWA Against Abiotic Stress in Tobacco Caused by Lack of Water

Tobacco plants at the stage of 3 developed leaves were watered twice with BTHWA at concentration of 20 mg/L, at a weekly intervals. Control tomato plants were watered with water only. A week after the second treatment, plants were exposed to a stress factor in the form of lack of access to water. Compared to the control, 10 days after cessation of watering, the total mass of the plants untreated by BTHWA was 13% lower than the weight of the treated plants.

Example 26

Protection of Plants by Spraying with Solution Containing BTHWA Against Biotic Stress in Potatoes Caused by Viral Infection (Potato Virus Y, PVY)

A field experiment to evaluate the effectiveness of the foliar application of active substance BTHWA at a concentration of 20 mg/L, with the addition of mineral oil as adjuvant, in reducing effects of infections cause by potato by virus Y (PVY) was performed. The test was conducted on potato variety Altesse. The study was conducted on fields of about 20 m² in quadruplicate for each combination. The plants were sprayed with solution containing active substance at 7 days intervals.

Before the final tubers harvesting one tuber from each plant was collected to assess contamination with viruses. The evaluation of PVY infection in harvested tubers was performed using a DAS ELISA procedure. In control experiments above 85% of tubers were infected (Table 4). Foliar application of substances BTHWA (at a dose of 20 mg/L of operational fluid) to stimulate plants against viral infections in field conditions showed a nearly 50% reduction in the amount of PVY virus occurrence in the treated plants.

TABLE 4

Percentage of tubers infected by viruses (PVY)

| Application | % of tubers infected by PVY Virus |
| --- | --- |
| 1. Control | 87.7 |
| 2. Foliar application BTHWA 20 mg/L | 44.2 |
| 3. Tuber dressing (BTHWA 20 mg/L) + foliar application BTHWA 20 mg/L | 40.7 |

Initial viral contamination of seed material: PVY - 7%, PVS - 1%, PVA, PVM, PVX, PLRC - 0%

Example 27

**Protection of Plants by Spraying with Solution Containing BTHWA Against Biotic Stress in Barley Caused by Fungal Infection (*Pyrenophora teres*)**

A field experiment based on evaluation of the effectiveness of foliar application of active substance BTHWA at a concentration of 20 mg/L with the addition of mineral oil adjuvant in reducing infection of fungi *Pyrenophora teres* in barley (*Hordeum vulgare* (spring)) was performed. The test was conducted on a variety of barley Hordeum vulgare (spring). As such, six applications of the active substance solution was made. The study was conducted on fields of about 25 m² in quadruplicate for each combination tested. The plants were sprayed with operational fluid at 10 days intervals.

Solutions of the test substance at any time during the application did not cause phytotoxic effects on crops. The evaluation of fungal infestation of the grains was carried out after harvest. The following table (Table 5) shows percentage of infection and percentage of effectiveness against a fungal pathogen as determined on crops harvested 13 days after the last treatment compared to the control plants (treated with water). Efficacy of BTHWA in preventing infection of *Pyrenophora teres* was at around 70% and the percentage of fungal infection, only 17% (compared to 65% for controls).

TABLE 5

Results of the field tests on Barley (*Hordeum vulgare* (spring)) - fungal infection by *Pyrenophora teres*
Pest Scientific Name: *Pyrenophora teres*
Crop Scientific Name: *Hordeum vulgare*

| Trt No | Treatment | % of infection | % efficacy |
| --- | --- | --- | --- |
| 1 | Untreated Check | 61.25 | 0.00 |
| 2 | BTHWA 20 mg/L Trend 90 EC | 17.50 | 71.55 |

Example 28

**Protection of Plants by Spraying with Solution Containing BTHWA Against Biotic Stress in Barley Caused by Fungal Infection (*Rhynchosporium secalis*)**

A field experiment based on evaluation of the effectiveness of foliar application of active substance BTHWA at a concentration of 20 mg/L with the addition of mineral oil adjuvant in reducing infection of fungi *Rhynchosporium secalis* in barley (*Hordeum vulgare* (spring)) was performed. The test was on a variety of barley *Hordeum vulgare* (spring). There were six applications of the active substance solution. The study was conducted on fields of about 25 m² in quadruplicate for each combination tested. The plants were sprayed with operational fluid at 10 days intervals.

Solutions of the test substance at any time during the application did not cause phytotoxic effects on crops. The evaluation of fungal infestation of the grains was carried out after harvest. The following table (Table 6) shows percentage of infection and percentage of effectiveness against a fungal pathogen as determined on crops harvested 13 days after the last treatment compared to the control plants (treated with water). Efficacy of BTHWA in preventing infection of *Rhynchosporium secalis* was at around 60% and the percentage of fungal infection, only 10% (compared to 26% for controls).

TABLE 6

| Results of the field tests on Barley (*Hordeum vulgare* (spring)) - fungal infection by *Rhynchosporium secalis*<br>Pest Scientific Name: *Rhynchosporium secalis*<br>Crop Scientific Name: *Hordeum vulgare* | | | |
|---|---|---|---|
| Trt No | Treatment | % of infection | % efficacy |
| 1 | Untreated Check | 26.25 | 0.00 |
| 2 | BTHWA 20 mg/L Trend 90 EC | 10.63 | 59.17 |

Example 29

Protection of Plants by Spraying with Solution Containing BTHWA Following with the Treatment with Common Fungicide at Decreased Dose (by 50%) Against Biotic Stress in Barley Caused by Fungal Infection (*Pyrenophora teres*)

A field experiment to investigate the effectiveness of foliar application of active substance BTHWA at a concentration of 20 mg/L (with the addition of commercial adjuvant) followed by treatment with common fungicide (tebukonazole in formulation containing 250 g of active substance to be applied per 1 ha) in reducing infection of fungi *Pyrenophora teres* in barley (Hordeum vulgare (spring)) was performed. The fungicide was applied in an amount of 50% its recommended dose (125 g/ha). Six applications of the active substance BTHWA solution were made. As a control, one application of fungicide was performed at the time as indicated on the product label. The study was conducted on fields of about 25 $m^2$ in quadruplicate for each combination tested. The plants were sprayed with operational fluid of BTHWA at 10 days intervals.

Solutions of the test substance at any time during the application did not cause phytotoxic effects on crops. The evaluation of fungal infestation of the grains was carried out after harvest. The following table (Table 7) shows percentage of infection and percentage of effectiveness against a fungal pathogen as determined on crops harvested 13 days after the last treatment with BTHWA compared to the control plants (treated with water and treated with fungicide alone at full dose). The combined treatment of BTHWA and fungicide resulted in about 95% efficacy in preventing infection of Pyrenophora teres and the percentage of fungal infection, only 3%.

TABLE 7

| Results of the field tests on Barley (*Hordeum vulgare* (spring)) - fungal infection by *Pyrenophora teres*<br>Pest Scientific Name: *Pyrenophora teres*<br>Crop Scientific Name: *Hordeum vulgare* | | | |
|---|---|---|---|
| Trt No | Treatment | % of infection | % efficacy |
| 1 | Untreated Check | 65.75 | 0.00 |
| 2 | tebukonazole 1x treatment 250 g/ha | 6.00 | 90.87 |
| 3 | BTHWA 20 mg/L + tebukonazole 1x treatment 125 g/ha | 3.75 | 94.30 |

Example 30

Protection of Plants by Spraying with Solution Containing BTHWA Following with the Treatment with Common Fungicide at Decreased Dose (by 66%) Against Biotic Stress in Barley Caused by Fungal Infection (*Pyrenophora teres*)

A field experiment to investigate the effectiveness of foliar application of BTHWA at a concentration of 20 mg/L (with the addition of commercial adjuvant) followed by treatment with common fungicide (tebukonazole in formulation containing 250 g of active substance to be applied per 1 ha) in stimulating (and reducing infection) of fungi *Pyrenophora teres* in barley (*Hordeum vulgare* (spring)) was performed. The fungicide was applied in an amount of 33% its recommended dose (83 g/ha). Six applications of the active substance BTHWA solution were made. As a control, one application of fungicide was performed at the time as indicated on the product label. The study was conducted on fields of about 25 $m^2$ in quadruplicate for each combination tested. The plants were sprayed with operational fluid of BTHWA at 10 days intervals.

Solutions of the test substance at any time during the application did not cause phytotoxic effects on crops. The evaluation of fungal infestation of the grains was carried out after harvest. The following table (Table 8) shows percentage of infection and percentage of effectiveness against a fungal pathogen as determined on crops harvested 13 days after the last treatment with BTHWA compared to the control plants (treated with water and treated with fungicide alone at full dose). The combined treatment of BTHWA and fungicide resulted in about 90% efficacy in preventing infection of Pyrenophora teres and the percentage of fungal infection, only 5%.

TABLE 5

| Results of the field tests on Barley (*Hordeum vulgare* (spring)) - fungal infection by *Pyrenophora teres*<br>Pest Scientific Name: *Pyrenophora teres*<br>Crop Scientific Name: *Hordeum vulgare* | | | |
|---|---|---|---|
| Trt No | Treatment | % of infection | % efficacy |
| 1 | Untreated Check | 65.75 | 0.00 |
| 2 | tebukonazole 1x treatment 250 g/ha | 6.00 | 90.87 |
| 3 | BTHWA 20 mg/L + tebukonazole 1x treatment 125 g/ha | 5.50 | 91.63 |

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

What is claimed is:

1. A method of improving plant growth, the method comprising contacting a plant that has a viral infection, bacterial infection, or fungal infection with an agriculturally effective amount of a composition comprising an amide 7-carboxybenzo[1,2,3]thiadiazole of Formula I to improve growth in the plant,

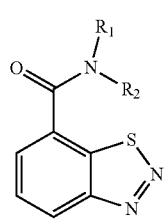

Formula I wherein $R_1$ is selected from a $C_1$-$C_{10}$ linear alkyl group, a $C_3$-$C_{10}$ branched alkyl group, and a $C_3$-$C_{10}$ cyclic alkyl group, $R_2$ is selected from a $C_1$-$C_{10}$ linear alkoxy group, a $C_3$-$C_{10}$ cyclic alkoxy group, or a $C_3$-$C_{10}$ branched alkoxy group, wherein the composition does not further comprise a fungicidal, antiviral, or antibacterial agent.

2. The method according to claim 1, wherein $R_1$ is selected from a $C_1$-$C_6$ linear alkyl group.

3. The method according to claim 1, wherein the composition comprises N-methoxy-N-methyl-1,2,3-benzothiadiazole-7-carboxamide.

4. The method according to claim 1, wherein the plant has a disease caused by a pathogenic agent and the pathogenic agent is selected from *Pseudomonas syringae* pv. tomato, powdery mildew, and combinations thereof.

5. The method according to claim 1, wherein the plant has a disease caused by a pathogenic agent and the pathogenic agent is selected from tobacco mosaic virus, Potato Virus Y, Brome mosaic virus, and combinations thereof.

6. The method according to claim 1, wherein the composition comprises an aqueous solution, an organic solvent, or a mixture thereof.

7. The method according to claim 1, wherein the composition comprises a mixture of organic and inorganic solvents, wherein the organic and inorganic solvents are in a ratio of from 1:1000 to 1000:1.

8. The method according to claim 6, wherein the composition comprises water and an alcohol.

9. The method according to claim 1, wherein the composition is an emulsion.

10. The method according to claim 1, wherein the compound of Formula I is applied at a rate of from 0.01 g ai/ha to 100 g ai/ha.

11. The method according to claim 1, wherein the composition further comprises an adjuvant in an amount of 10% by volume or less, based on the volume of the composition.

12. The method according to claim 1, wherein the roots or leaves of the plant are contacted with the composition.

13. The method according to claim 1, wherein the composition is contacted to the roots of the plant by spraying the soil, mechanical incorporation, mixing with a fertilizer, or by soil improvement.

14. The method according to claim 1, wherein the plant has a disease caused by *Pyrenophora teres*.

15. The method according to claim 1, wherein the plant is selected from forage crop, oilseed crop, grain crop, fruit crop, vegetable crop, fiber crop, spice crop, nut crop, turf crop, sugar crop, beverage crop, and forest crop.

16. The method according to claim 1, wherein the plant is selected from alfalfa, apple, *arabidopsis*, banana, barley, canola, castor bean, *chrysanthemum*, clover, cocoa, coffee, cotton, cottonseed, corn, *crambe*, cranberry, cucumber, dendrobium, dio-scorea, *eucalyptus*, fescue, flax, *gladiolus*, liliacea, linseed, millet, muskmelon, mustard, oat, oil palm, oilseed rape, *papaya*, peanut, pineapple, an ornamental plant, *phaseolus*, potato, rapeseed, rice, rye, ryegrass, safflower, sesame, sorghum, soybean, sugarbeet, sugarcane, sunflower, strawberry, tobacco, tomato, turfgrass, wheat, lettuce, celery, broccoli, cauliflower, cucurbits, onions, a fruit or nut tree, a fruit shrub or bramble, or a forest tree.

17. The method according to claim 1, wherein $R_1$ is selected from the group consisting of a $C_4$-$C_{10}$ linear alkyl group and a $C_4$-$C_{10}$ linear alkoxy group.

18. The method according to claim 1, wherein the composition is contacted to the plant at least two times.

19. The method according to claim 1, wherein the composition is contacted to the plant once per 5 to 21 days.

20. A method for combatting effects of plant disease in a plant that has a viral infection, bacterial infection, or fungal infection, the method comprising contacting the plant with an agriculturally effective amount of a composition comprising an amide 7-carboxybenzo[1,2,3]thiadiazole of Formula I to combat the effects of plant disease,

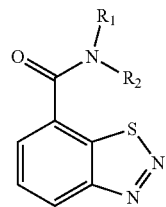

Formula I wherein $R_1$ is selected from a $C_1$-$C_{10}$ linear alkyl group, a $C_3$-$C_{10}$ branched alkyl group, and a $C_3$-$C_{10}$ cyclic alkyl group, $R_2$ is selected from a $C_1$-$C_{10}$ linear alkoxy group, a $C_3$-$C_{10}$ cyclic alkoxy group, or a $C_3$-$C_{10}$ branched alkoxy group, wherein the composition does not further comprise a fungicidal, antiviral, or antibacterial agent.

* * * * *